US012136761B2

(12) United States Patent
Nishikido

(10) Patent No.: US 12,136,761 B2
(45) Date of Patent: Nov. 5, 2024

(54) ANTENNA DEVICE, AND VEHICLE

(71) Applicant: Panasonic Intellectual Property Management Co., Ltd., Osaka (JP)

(72) Inventor: Tomoaki Nishikido, Ishikawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 124 days.

(21) Appl. No.: 17/764,508

(22) PCT Filed: Oct. 2, 2020

(86) PCT No.: PCT/JP2020/037538
§ 371 (c)(1),
(2) Date: Mar. 28, 2022

(87) PCT Pub. No.: WO2021/066140
PCT Pub. Date: Apr. 8, 2021

(65) Prior Publication Data

US 2022/0320720 A1 Oct. 6, 2022

(30) Foreign Application Priority Data

Oct. 2, 2019 (JP) ................................ 2019-182441

(51) Int. Cl.
*H01Q 1/32* (2006.01)
*H01Q 9/04* (2006.01)

(52) U.S. Cl.
CPC ......... *H01Q 1/3275* (2013.01); *H01Q 9/0407* (2013.01)

(58) Field of Classification Search
CPC .. H01Q 1/3275; H01Q 19/005; H01Q 19/106; H01Q 13/08; H01Q 9/0407; H01Q 9/0435; H01Q 9/0414
See application file for complete search history.

(56) References Cited

U.S. PATENT DOCUMENTS 4,887,089 A * 12/1989 Shibata ................ H01Q 1/3275 343/713
5,977,710 A * 11/1999 Kuramoto .............. H01Q 1/405 343/872
2004/0090369 A1* 5/2004 McCarrick ........... H01Q 9/0414 343/700 MS (Continued)

FOREIGN PATENT DOCUMENTS

JP 62-13104 A 1/1987
JP H0983240 A 3/1997
JP 2003-17916 A 1/2003

(Continued)

OTHER PUBLICATIONS

Extended European Search Report, dated Nov. 3, 2022, for European Patent Application No. 20872683.6. (9 pages).

(Continued)

*Primary Examiner* — Ricardo I Magallanes
*Assistant Examiner* — Aladdin Abdulbaki
(74) *Attorney, Agent, or Firm* — Seed IP Law Group LLP

(57) ABSTRACT

This antenna device is provided with: an antenna element disposed in a recessed portion of the exterior of a moving body; and a passive element which is disposed in a position higher than a flat surface in the recessed portion on which the antenna element is positioned.

7 Claims, 6 Drawing Sheets

(56) References Cited

U.S. PATENT DOCUMENTS

| | | | | |
|---|---|---|---|---|
| 2006/0139209 | A1* | 6/2006 | Tanaka ................. | H01Q 13/065 343/786 |
| 2010/0177003 | A1* | 7/2010 | Bashir .................. | H01Q 9/0407 343/834 |

FOREIGN PATENT DOCUMENTS

| | | | |
|---|---|---|---|
| JP | 2009282662 | A | 12/2009 |
| JP | 2017-153036 | A | 8/2017 |

OTHER PUBLICATIONS

International Search Report, mailed Dec. 1, 2020, for International Application No. PCT/JP2020/037538 (5 pages including translation).

* cited by examiner

400

ANTENNA DEVICE, AND VEHICLE

TECHNICAL FIELD

The present disclosure relates to an antenna apparatus and a vehicle.

BACKGROUND ART

A technology of embedding an antenna apparatus in the roof of a vehicle to eliminate the protrusion of the antenna apparatus from the roof in order not to impair the appearance of the vehicle has been developed.

For example, Patent Literature (hereinafter, referred to as "PTL") 1 discloses providing a recess in a roof (in other words, a recessed antenna accommodating portion), accommodating an antenna apparatus in the antenna accommodating portion, and closing the antenna accommodating portion with an accommodating lid being a part of the roof. With such a configuration, it is possible to eliminate a portion protruding outside the vehicle body to prevent the design of the vehicle from being impaired and the antenna from being broken.

CITATION LIST

Patent Literature

PTL 1
Japanese Patent Application Laid-Open No. 2003-017916

SUMMARY OF INVENTION

Technical Problem

However, with respect to the antenna apparatus disclosed in PTL 1, for example, the possibility that the performance (or characteristics) of the antenna apparatus may be deteriorated when the antenna apparatus is embedded in a vehicle roof has not been studied comprehensively.

The present disclosure provides, for example, a technique capable of suppressing deterioration in performance or characteristics of an antenna apparatus embedded in an exterior of a mobile entity.

Solution to Problem

An antenna apparatus in the present disclosure includes: an antenna element disposed in a recess in an exterior of a mobile entity; and a parasitic element disposed in the recess at a position distant from a horizontal plane in which a center of the antenna element is located.

It should be noted that general or specific embodiments may be implemented as a system, a method, an integrated circuit, a computer program, a storage medium, or any selective combination thereof.

Advantageous Effects of Invention

According to an aspect of the present disclosure, when the antenna apparatus is embedded in the exterior of the mobile entity, it is possible to suppress a decrease in performance or characteristics of the antenna apparatus.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, an embodiment will be described in detail with appropriate reference to the drawings. However, any unnecessarily detailed description may be omitted. For example, any detailed description of well-known matters and redundant descriptions on substantially the same configurations may be omitted. This is to avoid the unnecessary redundancy of the following description and to facilitate understanding of those skilled in the art.

It is to be noted that the accompanying drawings and the following description are provided to enable those skilled in the art to fully understand this disclosure, and are not intended to limit the claimed subject.

Embodiment 1

Hereinafter, an embodiment of the present disclosure will be described with reference to FIGS. 1 and 2.

1. Configuration

Figure 1A:
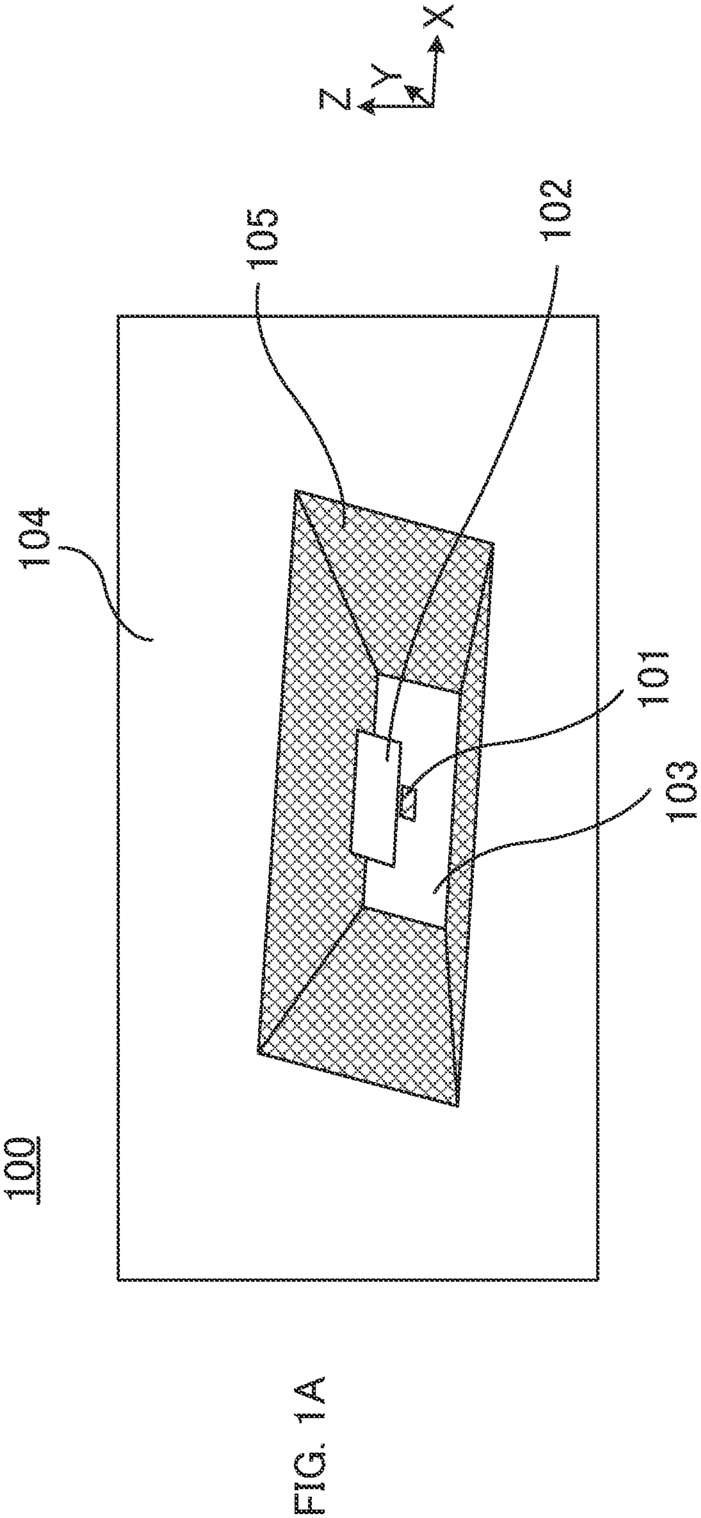
FIGS. 1A and 1B are a perspective view and a sectional view illustrating a configuration of a vehicle roof embedded antenna apparatus according to an embodiment of the present disclosure.
Figure 1B:
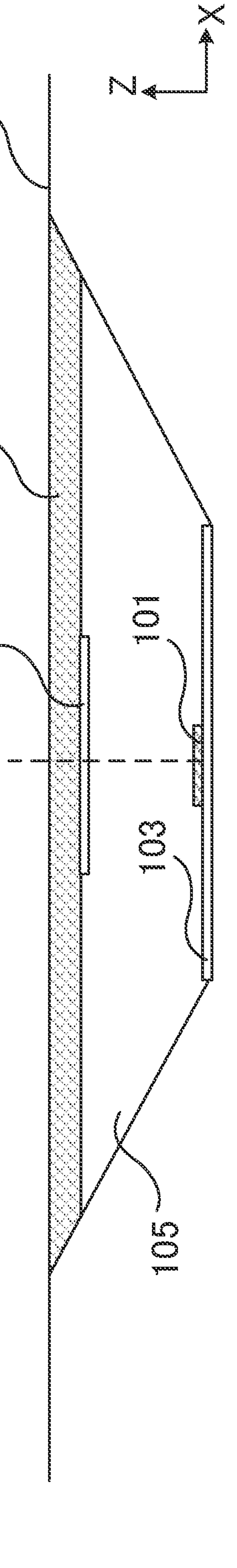

FIGS. 1A and 1B illustrate a configuration of a vehicle roof embedded antenna apparatus according to an embodiment of the present disclosure. FIG. 1A is a perspective view and FIG. 1B is an XZ sectional view. Note that, in the perspective view of FIG. 1A, a resin cover is removed for the purpose of description of the configuration. In FIGS. 1 to 5, the X direction is a front-rear longitudinal direction of a vehicle (e.g., +X is front and −X is rear), the Y direction is a left-right direction along the width of the vehicle, and the Z direction is the vertical height direction of the vehicle. The vehicle in the present specification is an example of a mobile entity (or mobility) and may include an automobile, train, or small electric vehicle. Non-limiting examples of the small electric vehicle include two-wheeled standing electric scooter, electric wagon, electric cart, or electric baby cart.

As seen in FIGS. 1A and 1B, vehicle roof embedded antenna apparatus 100 is used in a state of being embedded in recess 105 in vehicle roof 104. Vehicle roof 104 may be a painted conductive metal. Although FIGS. 1A and 1B illustrate a case where recess 105 in vehicle roof 104 is formed by a plurality of flat surfaces, the recess may also be formed by a combination of curved surfaces or of flat and curved surfaces. Recess 105 is a conductive metal like vehicle roof 104.

Patch antenna element 101 is disposed on the surface of dielectric substrate 103. The back surface of the dielectric substrate may be formed from the conductive metal of vehicle roof 104. Patch antenna element 101 is a rectangular (e.g., square) plate-shaped conductor, one side of which has a length corresponding to a half wavelength of an effective wavelength considering the wavelength shortening according to the dielectric constant of dielectric substrate 103, for example. The conductive metal of the back surface of dielectric substrate 103 is, for example, a rectangular (e.g., square) plate-shaped conductor, one side of which has a length longer than a half wavelength of a free space wavelength. For example, for 28 GHz, one side of patch antenna element 101 may be about 2.5 mm. One side of the conductive metal of the back surface of dielectric substrate 103 may be about 6 mm or greater, and is 20 mm, for example, in the present embodiment.

The patch antenna is a type of planar antenna and is also called a microstrip antenna.

Dielectric substrate 103 is, for example, disposed parallel or substantially parallel to the bottom surface of recess 105 in vehicle roof 104, and the conductive metal of vehicle roof 104 operates as the ground of patch antenna element 101.

The area of an opening in vehicle roof 104 is larger than the area of dielectric substrate 103, and in the present embodiment, one side of the opening in vehicle roof 104 is, for example, about 30 mm.

A feed point of patch antenna element 101 (not illustrated) is disposed at a position where it is possible to obtain matching, for example, with the impedance of radio circuitry (typically 50Ω).

Parasitic element 102 may be integrally molded with resin cover 106 formed of a resin having a low relative dielectric constant, for example, an Acrylonitrile Butadiene Styrene resin (ABS). The surface of parasitic element 102 is arranged parallel or substantially parallel to the surface of patch antenna element 101. The surface of parasitic element 102 is disposed, for example, higher than patch antenna element 101 such that a spacing of about a ¼ wavelength is interposed in between, and such that the center of the surface of parasitic element 102 and the center of the surface of patch antenna element 101 coincide or substantially coincide with each other. The length of one side of parasitic element 102 is equal to or longer than a half wavelength, for example.

2. Operation

A description will be given below of an example of the operation of vehicle roof embedded antenna apparatus 100 configured as described above.

Figure 2A:
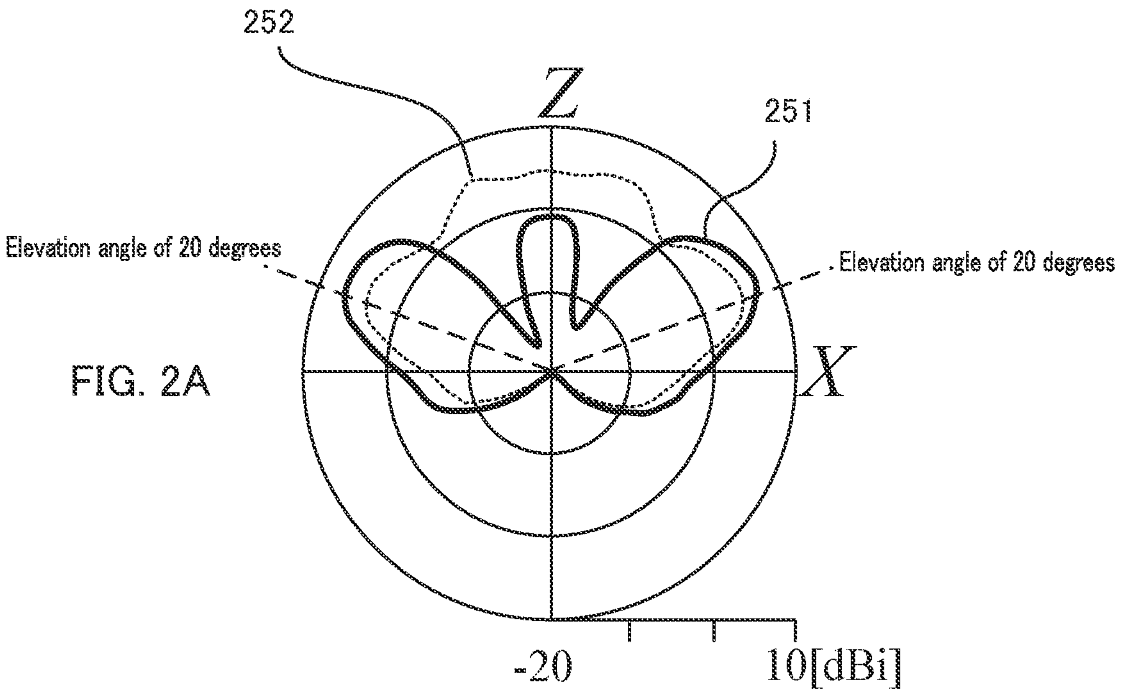
FIGS. 2A and 2B illustrate an example of radiation patterns of the vehicle roof embedded antenna apparatus according to an embodiment of the present disclosure.
Figure 2B:
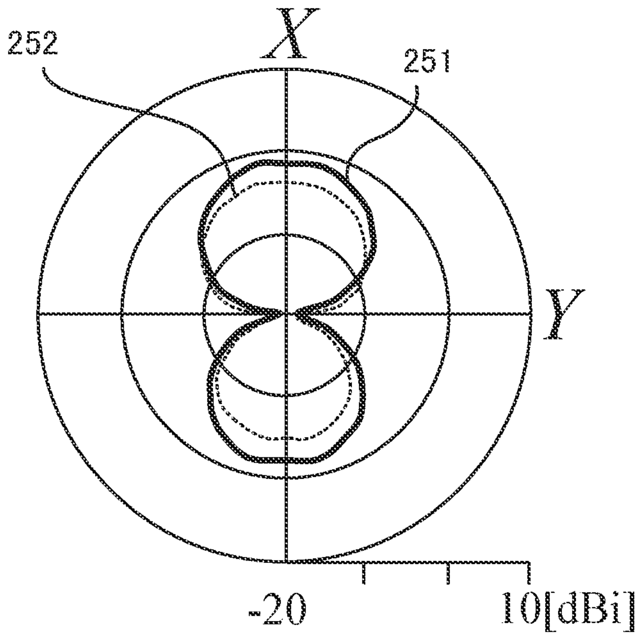

FIGS. 2A and 2B illustrate exemplary radiation patterns of the antenna apparatus according to an embodiment of the present disclosure. FIG. 2A illustrates the radiation patterns in the XZ plane, and FIG. 2B illustrates the radiation patterns in the XY plane. Solid line 251 expresses the characteristics of the antenna apparatus exhibited in a case where parasitic element 102 of patch antenna element 101 of vehicle roof embedded antenna apparatus 100 is provided, and dashed line 252 expresses the characteristics of the antenna apparatus exhibited in a case where no parasitic element 102 of patch antenna element 101 is provided. In FIGS. 2A and 2B, the operation gains are indicated in dBi.

Note that, in the present embodiment of FIGS. 1A and 1B, the length of one side of parasitic element 102 is set to, for example, 10.7 mm corresponding to one wavelength of the free space wavelength, and the spacing from patch antenna element 101 is set to, for example, 2.7 mm corresponding to a ¼ wavelength of the free space wavelength.

In general, when vehicle roof embedded antenna apparatus 100 communicates with a remote base station antenna, a gain at an elevation angle of about 20 degrees from the horizontal direction rather than a gain in the zenith direction (+Z direction) may be considered important.

When the antenna is embedded in vehicle roof 104, and generally, when there is no parasitic element 102, the radiation pattern as illustrated by broken line 252 in FIG. 2A results. In this case, the gain in the zenith direction (+Z direction (height direction)) is high, and the gain in the horizontal direction (X direction (longitudinal direction)) is small. On the other hand, by disposing parasitic element 102 with a length equal to or longer than a half wavelength above patch antenna element 101, parasitic element 102 suppresses the gain in the +Z direction, and correspondingly, the gain at an elevation angle of about 45 degrees from the horizontal direction is increased. This is a so-called lobe split operation. In this operation, it is possible to increase the gain at an elevation angle of about 45 degrees from the horizontal direction as illustrated by solid line 251 in FIG. 2A.

In the configuration of the present embodiment, in the case of considering the gains between the X direction and a direction of X+the elevation angle of 20 degrees, it can be expected that comparison between the gains in the presence and absence of parasitic element 102 shows the effect of improvement of 2.1 dB for the gain in the X direction due to the effect of parasitic element 102, and 1.8 dB for the gain in the direction of X+the elevation angle of 20 degrees.

3. Effects and the Like

As described above, in vehicle roof embedded antenna apparatus 100 in the present embodiment, patch antenna element 101 disposed on the bottom surface of recess 105 in vehicle roof 104 and parasitic element 102 with one side having a length equal to or longer than a half wavelength that is disposed higher than patch antenna element 101 are disposed such that the center of the surface of patch antenna element 101 coincides or substantially coincides with the center of the surface of parasitic element 102.

As described with reference to FIGS. 1 and 2, with such a configuration, it is possible to prevent the appearance of the vehicle from being impaired, because there is no protrusion from the vehicle roof, and it is also possible to increase the gain in the horizontal plane even when the antenna apparatus is embedded in the roof.

OTHER EMBODIMENTS

The embodiment has been described above as an example of the art disclosed in the present application. However, the art in the present disclosure is not limited to this example, and can be applied to embodiments in which changes, substitutions, additions, omissions, and the like are made. It is also possible to combine constituent elements described in the above embodiment into a new embodiment.

Here, other embodiments will be exemplified below.

Although the embodiment has been described in which the patch antenna configured with dielectric substrate 103 is used as an example of the antenna element, the antenna element only has to transmit and receive electromagnetic waves at a desired frequency. The antenna element may be, for example, a linear antenna or a loop antenna. Thus, the antenna element is not limited to the patch antenna configured with a dielectric substrate. The patch antenna configured with the dielectric substrate has a merit of allowing easy and inexpensive realization of the antenna apparatus.

In the description of the embodiment, parasitic element 102 has a side length of one wavelength. However, the same effect can be obtained as long as the side length is equal to or longer than a half wavelength or approximately as long as one wavelength.

In the embodiment illustrated in FIGS. 1A and 1B as described, the spacing between patch antenna element 101 and parasitic element 102 is about a ¼ wavelength, but the same effect can be obtained as long as the spacing is about 0.1 wavelength to one wavelength.

Figure 3:
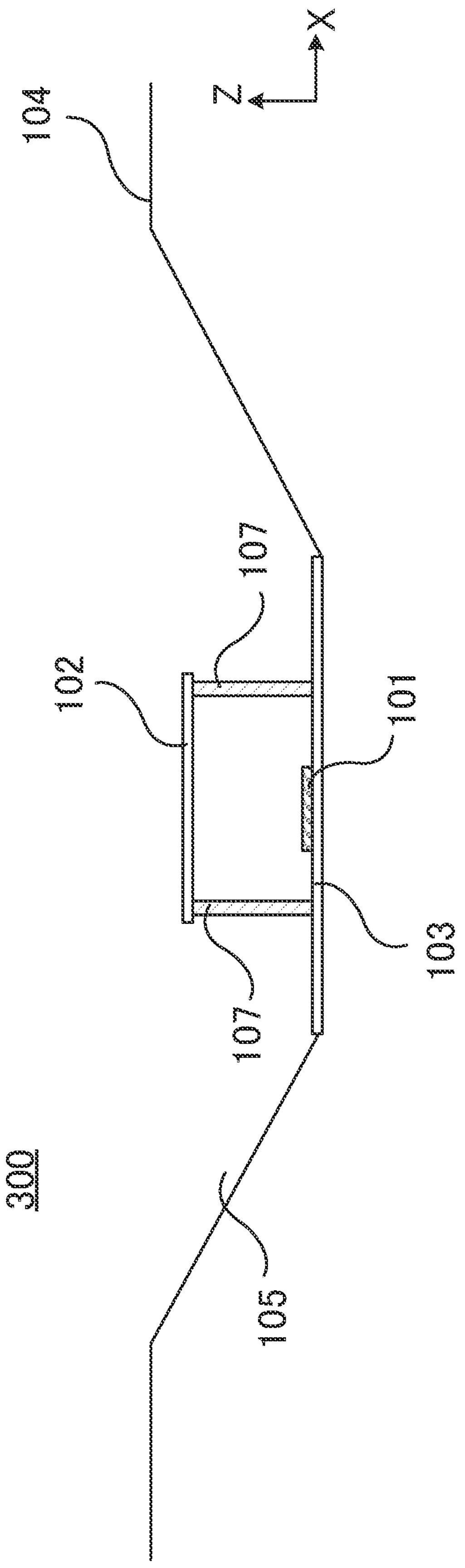
FIG. 3 is a sectional view illustrating a configuration of a holding method for holding a parasitic element of a vehicle roof embedded antenna apparatus according to an embodiment of the present disclosure.

FIG. 3 is a sectional view illustrating a configuration of a holding method for holding a parasitic element of vehicle roof embedded antenna apparatus 300 according to an embodiment of the present disclosure. In the embodiment illustrated in FIGS. 1A and 1B as described, attachment of parasitic element 102 to resin cover 106 (for example, integral molding) is taken as an example of the method for holding parasitic element 102 in the space within recess 105 (in other words, "aerial holding"). In addition to this, holding parasitic element 102 in the space within recess 105 above dielectric substrate 103 by spacer 107 formed using a resin having a low relative dielectric constant, for example, ABS resin or the like, as illustrated in FIG. 3, for example, can also obtain the same effect. The shape of spacer 107 may be columnar or wall-shaped as long as it holds parasitic element 102 in the space of recess 105.

Figure 4:
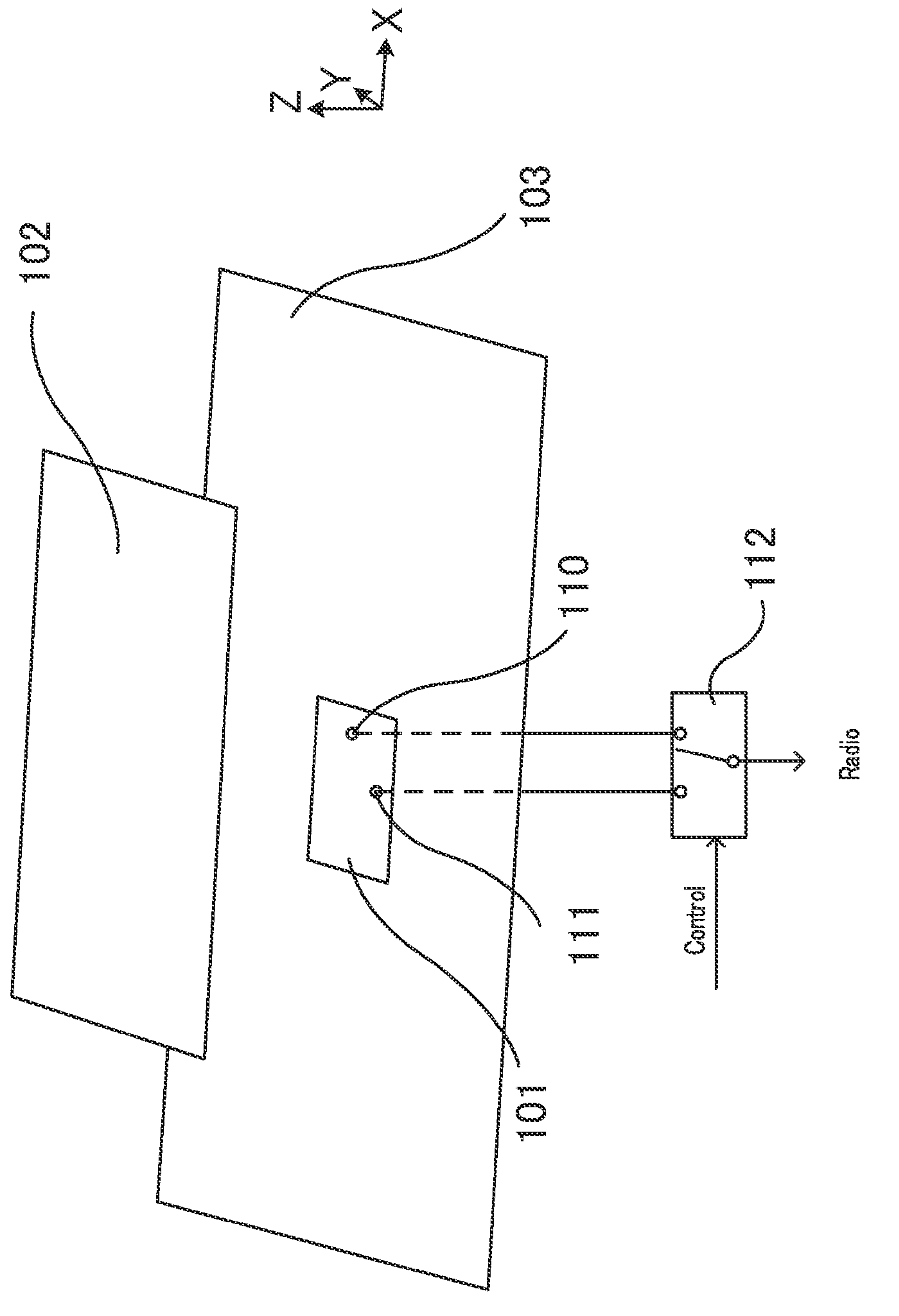
FIG. 4 is a perspective view illustrating a configuration of an antenna switching method for a vehicle roof embedded antenna apparatus according to an embodiment of the present disclosure.

FIG. 4 is a perspective view illustrating a configuration of an antenna switching method for vehicle roof embedded antenna apparatus 400 according to an embodiment of the present disclosure. In the embodiment illustrated in FIGS. 1A and 1B as described, the number of feed points of patch antenna element 101 is one. As illustrated in FIG. 4, vehicle roof embedded antenna apparatus 400 is provided with second feed point 111 at a position rotated 90 degrees from the position of first feed point 110. The power supply to these two feed points 110 and 111, for example, is switched in a time division manner by high-frequency switch 112. By such time division switching of power supply, it is possible to achieve the characteristics of a composite (or pseudo) omnidirectional antenna in the horizontal plane (XY plane). High-frequency switch 112 is controlled by a control signal, and the outputs from feed point 110 and feed point 111 are switched by switch 112 and are supplied to a radio.

It should be noted that, since the above-mentioned embodiments are for exemplifying the art in the present disclosure, various modifications, substitutions, additions, omissions, and the like can be performed within the scope of claims or the equivalent scope thereof.

Embodiment 2

Hereinafter, another embodiment of the present disclosure will be described with reference to FIGS. 5 and 6.

1. Configuration

Figure 5C:
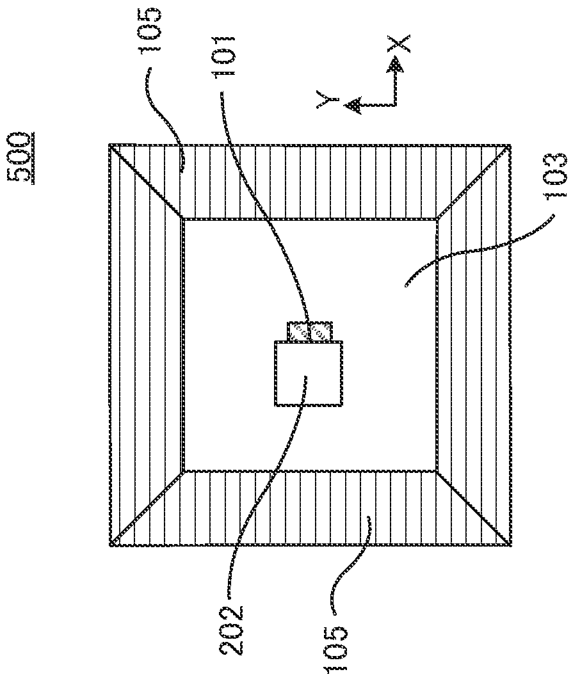
FIGS. 5A, 5B, and 5C are a perspective view, a sectional view, and a top view illustrating a configuration of a vehicle roof embedded antenna apparatus according to an embodiment of the present disclosure.
Figure 5A:
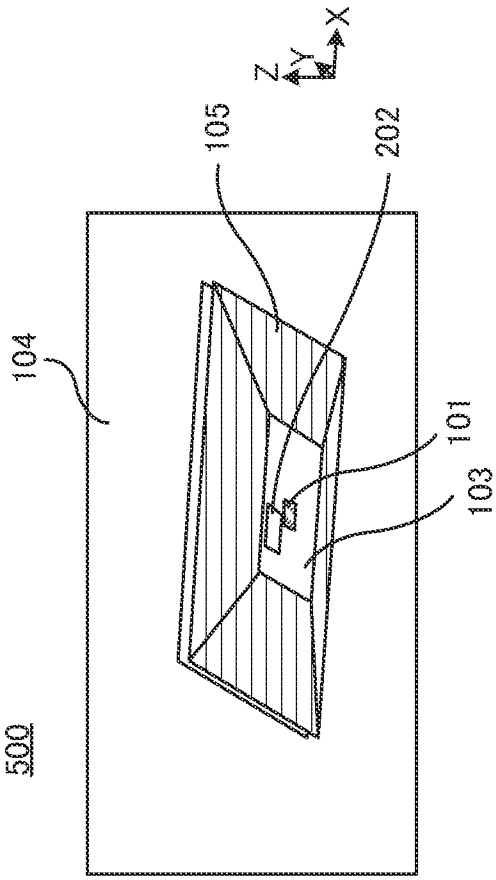
Figure 5B:
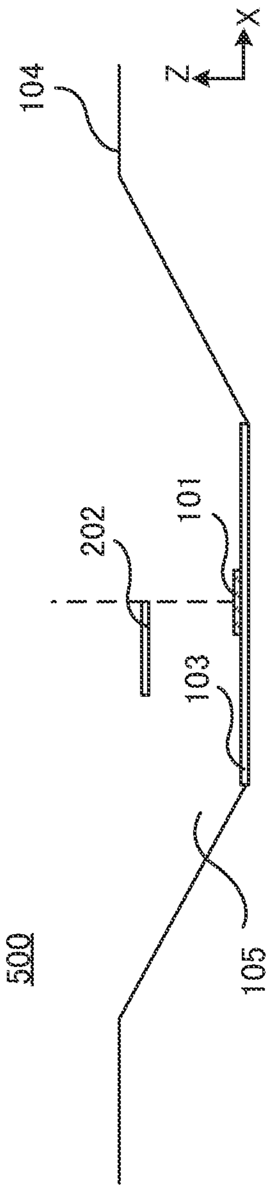

FIGS. 5A, 5B, and 5C illustrate a configuration of vehicle roof embedded antenna apparatus 500 according to Embodiment 2. FIG. 5A is a perspective view, FIG. 5B is an XZ sectional view, and FIG. 5C is a top view as viewed from the Z direction.

Note that, components the same between FIGS. 1 and 5 are provided with the same reference signs.

Parasitic element 202 is disposed such that the surface of parasitic element 202 is parallel or substantially parallel to the surface of patch antenna element 101, the surface of parasitic element 202 is higher than patch antenna element 101, with a spacing of about a ¼ wavelength being interposed in between, and the center of the surface of patch antenna element 101 and one side of parasitic element 202 coincide or substantially coincide with each other. The length of one side of parasitic element 202 is set to a length equal to or less than a half wavelength.

Note that, parasitic element 202 may be attached to the resin cover (not illustrated) covering vehicle roof recess 105 as illustrated in FIG. 1B, or may be integrally molded with the resin cover. Alternatively, parasitic element 202 may be held above dielectric substrate 103 using spacer 107 disposed on dielectric substrate 103 (in other words, in the space in recess 105), for example, as illustrated in FIG. 3.

2. Operation

A description will be given below of an example of the operation of vehicle roof embedded antenna apparatus 500 configured as described above.

Figure 6A:
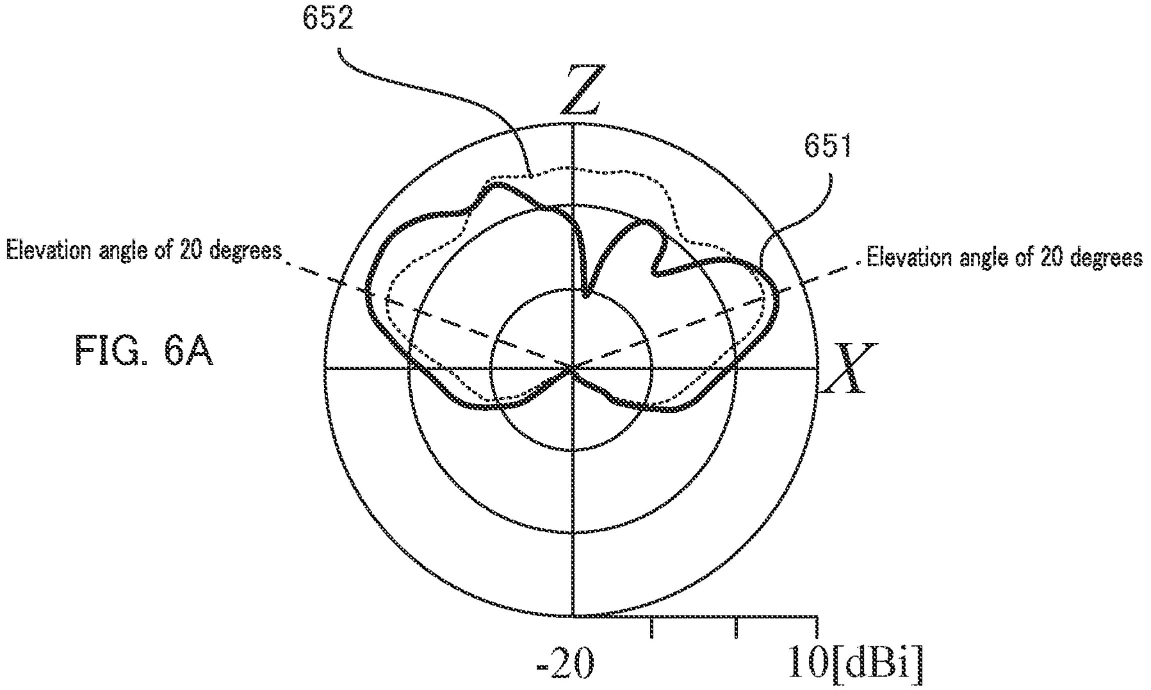
FIGS. 6A and 6B illustrates an example of a radiation pattern of the vehicle roof embedded antenna apparatus according to an embodiment of the present disclosure.
Figure 6B:
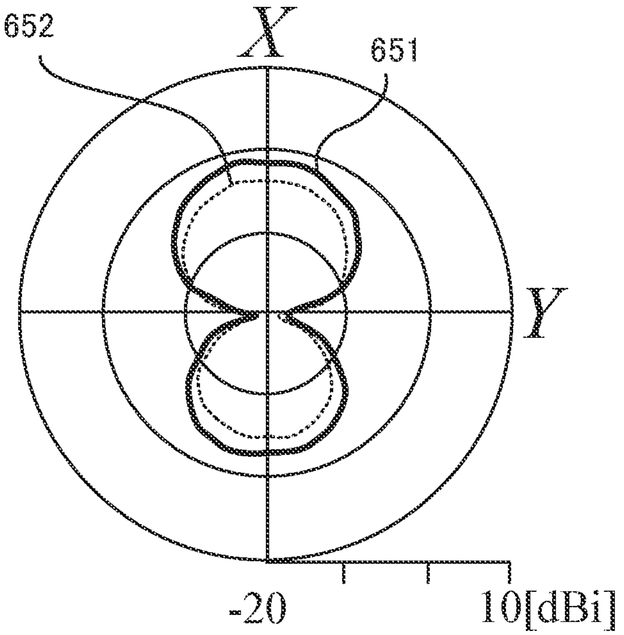

FIGS. 6A and 6B illustrate exemplary radiation patterns of the antenna apparatus. FIG. 6A illustrates the radiation patterns in the XZ plane, and FIG. 6B illustrates the radiation patterns in the XY plane. Solid line 651 represents characteristics exhibited when there is parasitic element 202 of patch antenna element 101 of vehicle roof embedded antenna apparatus 500, and broken line 652 represents characteristics exhibited when there is no parasitic element 202. In FIGS. 6A and 6B, the operation gains are indicated in dBi.

Note that, in the present embodiment of FIGS. 5A, 5B, and 5C, the length of one side of parasitic element 202 is set to, for example, 4.3 mm that is 0.1 wavelength shorter than the half wavelength of the free space wavelength, and the spacing from patch antenna element 101 is set to, for example, 2.7 mm that is a ¼ wavelength of the free space wavelength.

In general, when vehicle roof embedded antenna apparatus 500 communicates with a remote base station antenna, a gain at an elevation angle of about 20 degrees from the horizontal direction rather than a gain in the zenith direction (+Z direction (height direction)) may be considered important.

When the antenna apparatus is embedded in vehicle roof 104, and generally, when there is no parasitic element 202, the radiation pattern as illustrated by broken line 652 in FIG. 6A results. In this case, again in the zenith direction (+Z direction) is high, and again in the horizontal direction (X direction) is small. On the other hand, by disposing parasitic element 202 with a length equal to or shorter than a half wavelength on or above patch antenna element 101 at a position shifted from the center of patch antenna element 101, parasitic element 202 suppresses the gain in the +Z direction, and the so-called lobe split operation causing a correspondingly increased gain in the horizontal direction occurs. Consequently, when provided with parasitic element 202 illustrated in FIGS. 5A, 5B, and 5C, the antenna apparatus can increase the gain in the horizontal direction as illustrated by solid line 651 in FIG. 6A.

In the configuration of the present embodiment, in the case of considering the gains between the X direction and the direction of X+the elevation angle of 20 degrees, it can be expected that comparison between the gains in the presence and absence of parasitic element 202 shows the effect of improvement of 2.1 dB for the gain in the X direction due to the effect of parasitic element 202, and 1.3 dB for the gain in the direction of X+the elevation angle of 20 degrees.

3. Effects and the Like

As described above, in vehicle roof embedded antenna apparatus 500 in the present embodiment, patch antenna element 101 disposed on the bottom surface of recess 105 in vehicle roof 104 and parasitic element 202 with one side shorter than a half wavelength that is disposed higher than patch antenna element 101 are disposed such that the center of the surface of patch antenna element 101 coincides with one side of parasitic element 202.

With such a configuration, when the antenna apparatus is embedded in the exterior of the mobile entity, it is possible to suppress a decrease in performance or characteristics of the antenna apparatus. The exterior of the mobile entity includes a bonnet, a trunk, a door (front and rear), a bottom surface of a vehicle, and the like in addition to the vehicle roof.

Other Embodiments

The embodiment has been described above as an example of the art disclosed in the present application. However, the art in the present disclosure is not limited to this example, and can be applied to embodiments in which changes, substitutions, additions, omissions, and the like are made. It is also possible to combine constituent elements described in the above embodiment into anew embodiment.

Here, other embodiments will be exemplified below.

In the description of the embodiment, parasitic element 202 has a side length 0.1 wavelength shorter than a half wavelength. However, the same effect can be obtained with a configuration of a side length shorter than a half wavelength by a 0.1 to 0.25 wavelength.

The embodiment illustrated in FIGS. 5A, 5B, and 5C has been described in relation to the arrangement in which the center of the surface of patch antenna element 101 coincides with or substantially coincides with one side of parasitic element 202, but the present disclosure is not limited to this arrangement. For example, as long as one side of parasitic element 202 is located in the upper space above patch antenna element 101 (e.g., within the range of between ±half wavelength from the center of patch antenna element 101), the same effect can be expected. In other words, parasitic element 202 and patch antenna element 101 may be disposed in a range where the elements as seen in plan view partially overlap each other.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

It should be noted that, since the above-mentioned embodiments are for exemplifying the art in the present disclosure, various modifications, substitutions, additions, omissions, and the like can be performed within the scope of claims or the equivalent scope thereof.

Summary of Present Disclosure

An antenna apparatus in the present disclosure includes: an antenna element disposed in a recess in an exterior of a mobile entity; and a parasitic element disposed in the recess at a position distant from a horizontal plane in which a center of the antenna element is located.

In the antenna apparatus of the present disclosure, the mobile entity is a vehicle, and the recess is formed in a roof that is the exterior of the vehicle.

In the antenna apparatus of the present disclosure, the antenna element is a patch antenna configured using a dielectric substrate, and the patch antenna is disposed on a bottom surface of the recess.

In the antenna apparatus of the present disclosure, the parasitic element has a plate shape with a side having a length equal to or longer than a half wavelength of a radio wave received, and the position where the parasitic element is disposed is a position where a center of a surface of the plate shape coincides with a center of a surface of the antenna element, and, a spacing between the surface of the antenna element and the surface of the plate shape corresponds to a ¼ wavelength.

In the antenna apparatus of the present disclosure, the parasitic element has a plate shape with a side having a length shorter than a half wavelength of a radio wave received, and the position where the parasitic element is disposed is a position where one side of the plate shape coincides with a center of a surface of the antenna element, and, a spacing between the surface of the antenna element and a surface of the plate shape corresponds to a ¼ wavelength.

In the antenna apparatus of the present disclosure, the parasitic element is attached to a back surface of a lid portion covering the recess.

In the antenna apparatus of the present disclosure, the antenna element is a patch antenna configured using a dielectric substrate, a first feed point is disposed at a first position on a line along a first side of the patch antenna, a second feed point is disposed at a second position on a line along a second non-opposite side of the patch antenna, and the first feed point and the second feed point are fed with power in a time division manner.

A vehicle including the antenna apparatus of the present disclosure.

The disclosure of Japanese Patent Application No. 2019-182441 dated Oct. 2, 2019 including the specification, drawings and abstract is incorporated herein by reference in its entirety.

INDUSTRIAL APPLICABILITY

The present disclosure is applicable to, for example, an antenna apparatus embedded in a roof of a vehicle.

REFERENCE SIGNS LIST

100 Vehicle roof embedded antenna apparatus
101 Patch antenna element
102 Parasitic element
103 Dielectric substrate
104 Vehicle roof
105 Recess
106 Resin cover
107 Spacer
110 Feed point
111 Feed point
112 High-frequency switch
202 Parasitic element
300 Vehicle roof embedded antenna apparatus
400 Vehicle roof embedded antenna apparatus
500 Vehicle roof embedded antenna apparatus

The invention claimed is:

1. An antenna apparatus, comprising:

an antenna element disposed in a recess in an exterior of a mobile entity; and a parasitic element disposed in the recess at a position distant from a horizontal plane in which a center of the antenna element is located, wherein (1) the parasitic element has a plate shape with a side having a length equal to or longer than a half wavelength of a received radio wave, and the position where the parasitic element is disposed is a position where a center of a surface of the plate shape coincides with a center of a surface of the antenna element, and a spacing between the surface of the antenna element and the surface of the plate shape corresponds to a ¼ wavelength of the received radio wave, or (2) the parasitic element has a plate shape with a side having a length shorter than a half wavelength of a received radio wave, and the position where the parasitic element is disposed is a position where one side of the plate shape coincides with a center of a surface of the antenna element, and a spacing between the surface of the antenna element and a surface of the plate shape corresponds to a ¼ wavelength of the received radio wave, wherein the antenna element is a patch antenna configured using a dielectric substrate, a first feed point is disposed at a first position on a line along a first side of the patch antenna, a second feed point is disposed at a second position on a line along a second non-opposite side of the patch antenna, and the first feed point and the second feed point are fed with power in a time division manner.

2. The antenna apparatus according to claim 1, wherein the mobile entity is a vehicle, and the recess is formed in a roof that is the exterior of the vehicle.

3. The antenna apparatus according to claim 1, wherein the patch antenna is disposed on a bottom surface of the recess.

4. The antenna apparatus according to claim 1, wherein the parasitic element is attached to a back surface of a lid portion covering the recess.

5. A vehicle, comprising:

an antenna apparatus according to claim 1.

6. The antenna apparatus according to claim 1, wherein the parasitic element has a rectangular shape.

7. The antenna apparatus according to claim 1, further comprising:

a cover that covers an opening of the recess, the parasitic element being positioned on a surface of the cover that faces the antenna element.

* * * * *